(12) United States Patent
Mercier et al.

(10) Patent No.: US 9,397,507 B2
(45) Date of Patent: Jul. 19, 2016

(54) DEVICE FOR BALANCING THE CHARGE OF THE ELEMENTS OF AN ELECTRICAL POWER BATTERY

(71) Applicant: Commissariat a l'energie atomique et aux energies alternatives, Paris (FR)

(72) Inventors: Sylvain Mercier, Saint Egreve (FR); Daniel Chatroux, Teche (FR); Matthieu Desbois-Renaudin, Villard de Lans (FR); Laurent Garnier, Marennes (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 184 days.

(21) Appl. No.: 14/355,323

(22) PCT Filed: Oct. 24, 2012

(86) PCT No.: PCT/EP2012/071082
§ 371 (c)(1),
(2) Date: Apr. 30, 2014

(87) PCT Pub. No.: WO2013/064407
PCT Pub. Date: May 10, 2013

(65) Prior Publication Data
US 2014/0312844 A1    Oct. 23, 2014

(30) Foreign Application Priority Data

Oct. 31, 2011 (FR) .................................. 11 59866

(51) Int. Cl.
*H01M 10/46* (2006.01)
*H02J 7/00* (2006.01)
(Continued)

(52) U.S. Cl.
CPC .............. *H02J 7/0014* (2013.01); *B60L 11/005* (2013.01); *B60L 11/1803* (2013.01);
(Continued)

(58) Field of Classification Search
CPC ....... H02J 7/0013; H02J 7/1423; H02J 7/0018; H02J 7/0021; H02J 7/0026
USPC .......................... 320/116, 118, 119, 132, 149
See application file for complete search history.

(56) References Cited

U.S. PATENT DOCUMENTS

| 4,717,833 | A | 1/1988 | Small |
| 2005/0024015 | A1* | 2/2005 | Houldsworth ........ H02J 7/0016 320/119 |

(Continued)

FOREIGN PATENT DOCUMENTS

| EP | 1295757 | 3/2003 |
| EP | 2362480 | 8/2011 |

(Continued)

*Primary Examiner* — Edward Tso
(74) *Attorney, Agent, or Firm* — Occhiuti & Rohlicek LLP (57) ABSTRACT

A charge-balancing device for balancing charge of an electrical power-storage device that has several series-connected electrical storage elements two DC/DC converters with current limitation, each having an input for receiving a set value of output voltage from the converter, an input to be connected to the terminals of a respective storage element, and an output to be connected to an electric network having a voltage regulated at a level below a voltage at the terminals of the power-storage device, and a control module. The control module is configured to determine respective residual charges of the electrical storage elements connected to the inputs and to apply a higher set value of voltage to the converter connected to an electrical storage elements that has a highest residual charge.

15 Claims, 7 Drawing Sheets

(51) Int. Cl.
*H02J 1/10* (2006.01)
*B60L 11/18* (2006.01)
*B60L 11/00* (2006.01)

(52) U.S. Cl.
CPC ........ *B60L 11/1855* (2013.01); *B60L 11/1861* (2013.01); *B60L 11/1866* (2013.01); *H02J 1/102* (2013.01); *H02J 7/0052* (2013.01); *H02J 7/0065* (2013.01); *B60L 2210/10* (2013.01); *B60L 2240/545* (2013.01); *B60L 2240/547* (2013.01); *B60L 2240/549* (2013.01); *H02J 2007/0059* (2013.01); *Y02T 10/7005* (2013.01); *Y02T 10/7022* (2013.01); *Y02T 10/7044* (2013.01); *Y02T 10/7061* (2013.01); *Y02T 10/7216* (2013.01); *Y02T 10/92* (2013.01)

(56) References Cited

U.S. PATENT DOCUMENTS

2015/0035495 A1\* 2/2015 Yoshida .............. H01M 10/425
　　　　　　　　　　　　　　　　　　　　　　320/134
2015/0249389 A1\* 9/2015 Cummings ....... H02M 3/33507
　　　　　　　　　　　　　　　　　　　　　　363/21.12

FOREIGN PATENT DOCUMENTS

FR　　　　　11/51724　　　2/1958
WO　　　WO 01/37393　　　5/2001

\* cited by examiner

DEVICE FOR BALANCING THE CHARGE OF THE ELEMENTS OF AN ELECTRICAL POWER BATTERY

RELATED APPLICATIONS

Under 35 USC 371, this application is the national stage of PCT/EP2012/071082, filed on Oct. 24, 2012, which claims the benefit of the Oct. 31, 2011 filing date of French application FR1159866, the contents of which are herein incorporated by reference.

FIELD OF INVENTION

The invention pertains to a charge-balancing device for power batteries using electrochemical accumulators.

BACKGROUND

High-powered DC voltage electrical systems are undergoing major development. Indeed, many transportation systems include a DC voltage power supply.

Combustion/electric hybrid vehicles or electric vehicles have high-powered batteries. Such batteries are used to drive an AC electric motor by means of an inverter. The voltage levels needed for such motors can be hundreds of volts, typically on the order of 400 Volts. Such batteries generally also have high capacity in order to favor the autonomy of the vehicle in electrical mode.

To obtain high values of power and capacity, several groups of accumulators are placed in series, often called "stages." The number of stages and the number of accumulators connected in parallel in each stage vary according to the voltage, the current and the capacity desired for the battery. The association of several accumulators is called a battery of accumulators.

The electrochemical accumulators used for such vehicles are generally lithium-ion type accumulators because of their capacity to store substantial energy with a limited weight and volume. Lithium-ion iron phosphate ($LiFePO_4$) type batteries are undergoing major development because of a high intrinsic level of security, to the detriment of energy storage density which is somewhat lagging. An electrochemical accumulator usually has a nominal voltage of around 3.3 V for lithium-ion iron phosphate LiFePO4 technology, and around 4.2 V for cobalt-oxide based lithium-ion type technology.

The charging or discharging of an accumulator respectively results in an increase or decrease in the voltage at its terminals. An accumulator is considered to be charged or discharged when it has reached a voltage level defined by its electrochemical process. In a circuit using several stages of accumulators, the current flowing through the stages is the same. The level of charging or discharging of the stages therefore depends on the intrinsic characteristics of the accumulators. Differences in voltage between the stages appear during the charging or discharging owing to differences in manufacturing, aging, assembling and operating temperature between the different accumulators.

For an accumulator based on Li-ion technology, an excessively high or excessively low voltage, known as a threshold voltage, can damage or destroy the accumulator. For example, the overcharging of a cobalt-oxide-based Li-ion accumulator can lead to its thermal stalling and an outbreak of fire. For an iron-phosphate-based Li-ion accumulator, overcharging can lead to a decomposition of the electrolyte, which diminishes its service life or impairs it. An excessively great discharge, which leads to voltage below 2 V for example, causes mainly an oxidation of the current collector of the negative electrode when it is made of copper and therefore a deterioration of the accumulator. Monitoring the voltages at the terminals of each stage of accumulator(s) is therefore obligatory during the charging and discharging for reasons of security and reliability. A monitoring device is thus generally placed in parallel on each stage and enables this function to be fulfilled.

The function of the monitoring device is to track the state of charge (or residual charge) and discharge of each stage of accumulators and to transmit information to the control circuit in order to stop the charging or discharging of the battery when a stage has reached its threshold voltage. However, in a battery with several series-connected stages of accumulator(s), if the charging is stopped when the stage most charged reaches its threshold voltage, then it is quite possible the other stages have not yet been totally charged. Conversely, if the discharging is stopped when the stage most discharged has reached its threshold voltage, then it is quite possible that the other stages will not yet have totally discharged. In this case then, the capacity of each stage of accumulators is not exploited. This represents a major problem in transportation type applications with embedded batteries having high constraints of autonomy. To cope with this problem, the monitoring device is generally associated with a charge-balancing device.

The balancing device has the function of optimizing the charge of the battery, and therefore its autonomy, in leading the stages of series-connected accumulator(s) to a state-of-charge and/or state-of-discharge that is identical. There are two categories of balancing devices: energy dissipation devices and energy transfer devices.

In energy dissipation balancing systems, the voltage at the terminals of the stages is made uniform by diverting the charging current from one or more stages that have reached the threshold voltage and by dissipating the energy in a resistor. Alternatively, the voltage at the terminals of the stages is made uniform by discharging one of the stages that has reached the high voltage threshold.

However, such energy dissipation balancing systems have the major drawback of consuming more energy than necessary to charge the battery. Indeed, it is necessary to discharge several accumulators or divert the charging current of several accumulators so that the last accumulator or accumulators that are slightly less charged can complete their charging. The dissipated energy can therefore be much higher than the energy of the level or levels of charging still to be performed. Furthermore, they dissipate excess energy in the form of heat. This is not compatible with the constraints of integration into transportation type embedded applications, and significaly reduces service life of the accumulators when the temperature rises.

The energy transfer balancing systems exchange energy between the auxiliary battery or an auxiliary energy network and the stages of accumulators.

The energy transfer can be either one-directional, from the battery to the stages or the stages to the battery, or bidirectional, from the battery to the stages and from the stages to the battery or from adjacent stage to adjacent stage.

To limit losses during energy transfers, the patent application, FR11/51724, which has not been published as the priority date of the present application, describes an improved balancing device. This document proposes the use of a structure based on the principle of a flyback converter to ensure balancing of the stages of accumulator(s) through the discharging of the stage or stages for which the state or states of charging and/or the capacity or capacities are higher as well as energy transfer from the battery of accumulators, known as power batteries, to the auxiliary network of the vehicle. The use of a buck converter needed to power the low-voltage auxiliary network from a high voltage battery can thus be avoided. Furthermore, the auxiliary network can be powered solely by balancing devices without the use of an auxiliary battery.

To simplify the regulation of the parallel-connected balancing devices, the devices are controlled individually. Thus, the accumulator(s) stage that has the highest capacity and/or state-of-charge supplies the energy to the auxiliary network. The individual operation of the balancing devices requires the active balancing device to provide all the energy required on the auxiliary network. The sizing of the balancing devices must therefore be done accordingly.

To reduce and distribute the power provided by each balancing device, it is known, for example from U.S. Pat. No. 4,717,833, to simultaneously use different balancing devices. In particular, the '833 patent proposes a command using a method of regulation providing for the sharing of the currents between the balancing devices so as to prevent certain converters from having to work more than others because of disparities between these converters. The '833 patent presents a method of interdependent control of parallel-connected converters. The method of control implements a measurement of current and a measurement of voltage by and on each converter and makes use of an interconnection bus between the converters. The interconnection bus enables the exchange of information on the sharing of the currents between the converters.

Because of this, the regulation loops are dependent on one another and have to be synchronized. This physical link between converters must be insensitive to parasitic noises and must in no case cause the converters to stop working when it is in an open state or in a short circuit. This physical link must furthermore be sized according to the presence of the different levels of voltage between the stages or elements, with amplitudes. Implementation of this scheme is complex and costly in its development and in its manufacture.

SUMMARY

The invention seeks to resolve one or more of these drawbacks.

In one aspect, the invention features a device for balancing the charge of an electrical power storage device including several series-connected storage elements comprising at least two DC/DC converters with current limitation, each having an input for receiving a set value of output voltage of the converter; an input to be connected to the terminals of a respective storage element; an output to be connected to an electrical network having a voltage regulated at a level below the voltage at the terminals of the storage device; and a control module for determining the respective residual charges of the elements connected to the inputs and for applying a higher set value of voltage to the converter connected to the element having the highest residual charge.

In one embodiment, each converter includes a current sensor at its output and a voltage sensor at its output.

In another embodiment, each converter comprises a regulation loop for regulating the voltage applied to its output, the regulation loop lowering this set value of voltage proportionally to the current provided by the converter at its output.

In yet another embodiment, the control module is configured to apply identical set values of voltage to at least two converters.

Additional embodiments include those in which the control module generates a set value of voltage for each converter proportional to its determined residual charge.

Also included within the scope of the invention are embodiments in which the control module generates set values of voltage that are distinct and stepped according to identical voltage increments.

In some embodiments, the hierarchy for the assigning of set values of voltage by the control module corresponds to the hierarchy of the determined residual charges.

In other embodiments, the converter includes a transformer, a primary winding of which is connected as a bridge between four switches controlled in pulse-width modulation by the control module.

In yet other embodiments, the transformer is a mid-point transformer, a secondary winding of which is connected between two switches controlled by the control module, the secondary winding comprising a mid-point connected to an output of the converter.

The invention can also be applied to super-capacitors.

In another aspect, the invention features an electrical power system comprising: a charge-balancing device as defined above; an electrical power storage device including several electrical storage elements, the elements being connected to respective converters of the charge-balancing device; and an electrical network connected to the output of the charge-balancing device and having a voltage regulated at a level below the voltage at the terminals of the storage device.

In one embodiment, the set values of voltages are included in the range of regulation voltages of said network.

In another embodiment, the control module is configured to: retrieve a measurement of the current provided by the balancing device to the network; and extrapolate the residual charge of each of the storage elements according to the measurement of current retrieved.

In yet another embodiment, the storage device is a power battery with electrochemical accumulators.

Among the embodiments are those in which the nominal voltage of the power battery is at least six times greater than the nominal voltage of regulation of the network.

In another aspect, the invention features a motor vehicle including a system as defined hereinabove in which the network is an auxiliary power network for powering peripherals, the regulation voltage of which ranges from 10.5 volts to 14 volts.

BRIEF DESCRIPTION OF THE FIGURES

Other features and advantages of the invention shall appear more clearly from the following description given by way of an indication that is in no way exhaustive, and made with reference to the appended drawings, of which.

DETAILED DESCRIPTION

Figure 1:
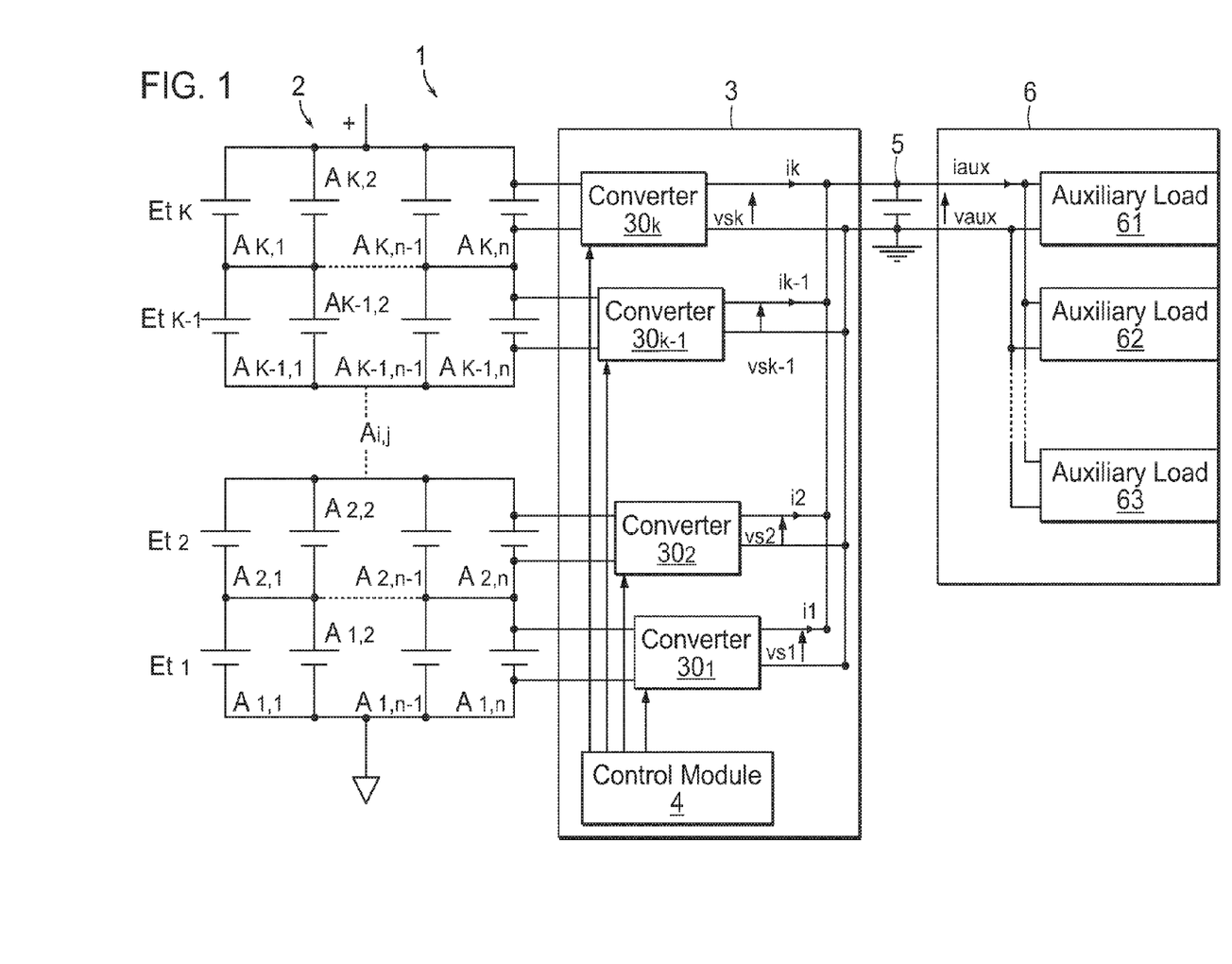
FIG. 1 is a schematic representation of an example of an electrical power system implementing the invention.

FIG. 1 is a schematic representation of an electrical power system 1 including a power battery 2. The battery 2 comprises k stages $Et_1$ to $Et_k$, forming k electrical storage elements electrically connected in series (with k equal to at least 2, and preferably at least equal to 3). Each stage i advantageously includes n accumulators $Ai,1$ to $Ai,n$ electrically connected in parallel (with n at least equal to 2). The electrical power supply system 1 also includes a charge-balancing device 3 of the battery 2. The voltage across the positive terminal and the negative terminal of the battery 2 has a value typically ranging from 100 V to 750 V, for example of the order of 400 V. The battery 2 is intended, for example, for supplying the motor of a hybrid or electric vehicle by being connected to the terminals of an inverter and is advantageously insulated from the metal frame of such a vehicle.

The balancing device 3 comprises a connection interface configured to be connected to the terminals of each of the stages or elements Eti. The balancing device 3 also has a connection interface configured to be connected to an auxiliary network 6, for example, an electrical network on board a vehicle, the voltage of which is generally regulated at a value close to 12 volts. This regulated voltage can, for example, vary in a range of 10.5 volts to 14 volts. This regulated voltage is typically at least six times smaller than the voltage at the terminals of the battery 2.

The balancing device 3 comprises converters $30_1$ to $30_k$, for example, one converter per stage of the battery 2. It is also possible to provide for a converter for several series-connected stages of the battery 2. The converters $30_1$ to $30_k$ are advantageously insulated. The converters $30_1$ to $30_k$ can be one-directional or bidirectional converters. As described here below, the converters $30_1$ to $30_k$ are to provide both for the balancing of the stages Eti of the battery 2 and for the power supply to the auxiliary network 6, in respectively applying output voltages $vs_1$ to $vs_k$ and output intensities $i_1$ to $i_k$. The output of each of the converters $30_1$ to $30_k$ is connected to the auxiliary network 6 to apply a same potential difference $V_{aux}$ to the terminals of the auxiliary network 6.

The balancing device 3 also includes a control module 4 connected to the converters $30_i$. An auxiliary battery 5 (or a capacitor or a super-capacitor) is advantageously connected to the terminals of the network 6.

Figure 2:
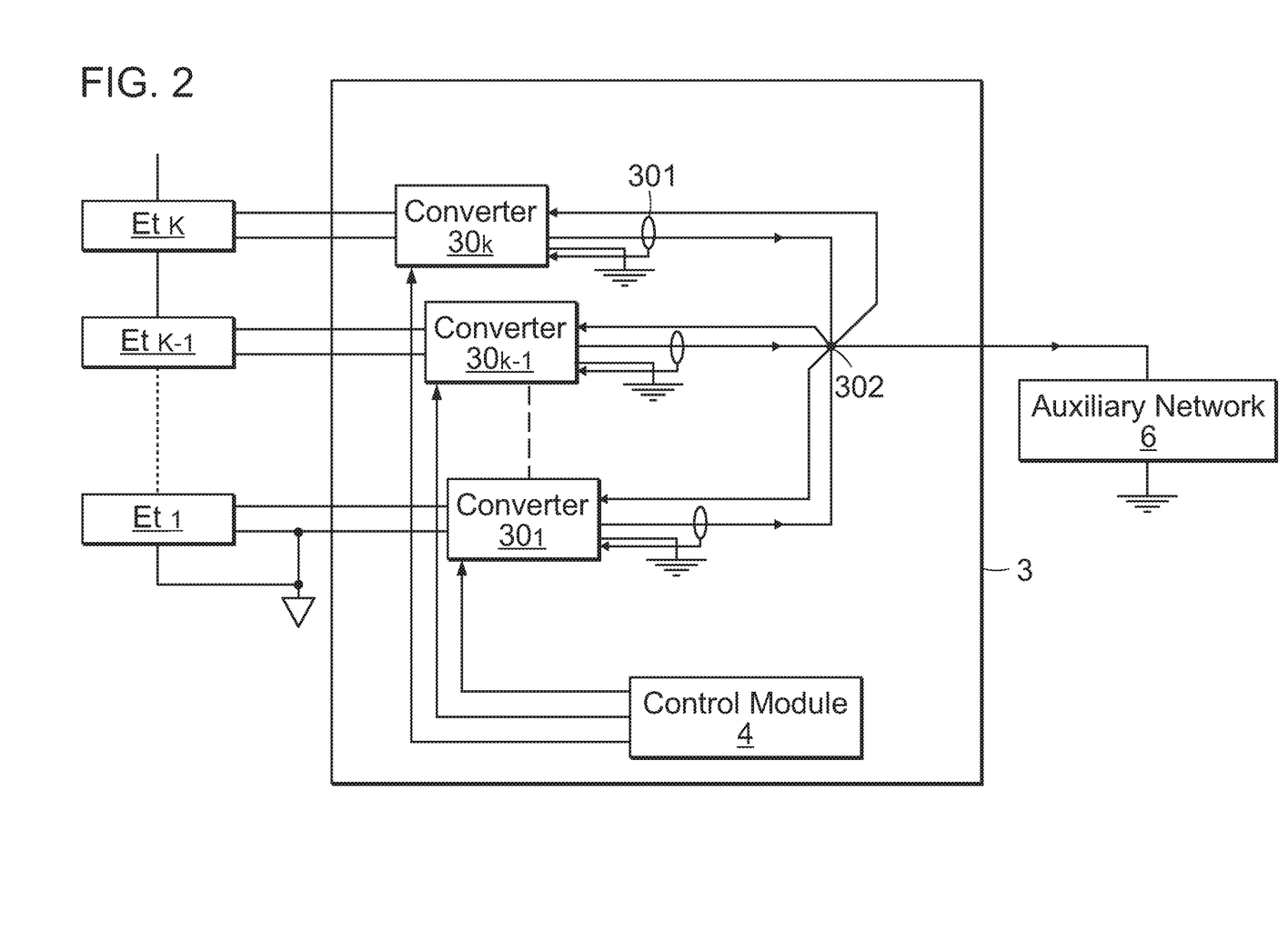
FIG. 2 illustrates an example of measurements exploited by converters of a balancing device.

FIG. 2 provides a more detailed illustration of the information used by the converters $30_1$ to $30_k$ to implement the invention. Each converter $30_i$ retrieves (by internal measurement or by a measurement given, for example, by the control module 4), the voltage value $v_{aux}$, at its output (identical to its output voltage $vs_i$) and the value of intensity $i_i$ that it provides at its output to the auxiliary network 6. Auxiliary loads (61, 62, 63) such as an air-conditioning unit, a car radio, etc., are connected to the network 6. Each converter also retrieves a set value of voltage $v_i$ provided by the control module 4.

The converters $30_1$ to $30_k$ are designed as voltage sources limited in current. A converter $30_i$ has a current limitation denoted as $I_{imax}$.

The control module 4 determines (by measurement or by computation as described here below) the residual charge of the different stages Eti of the battery 2. The control module 4 can especially determine the residual charge of a stage by determining the state of charge and the capacity of that stage. The control module 4 generates set values of voltage higher than the others for the converters whose stages are determined as being the most charged.

Figure 5:
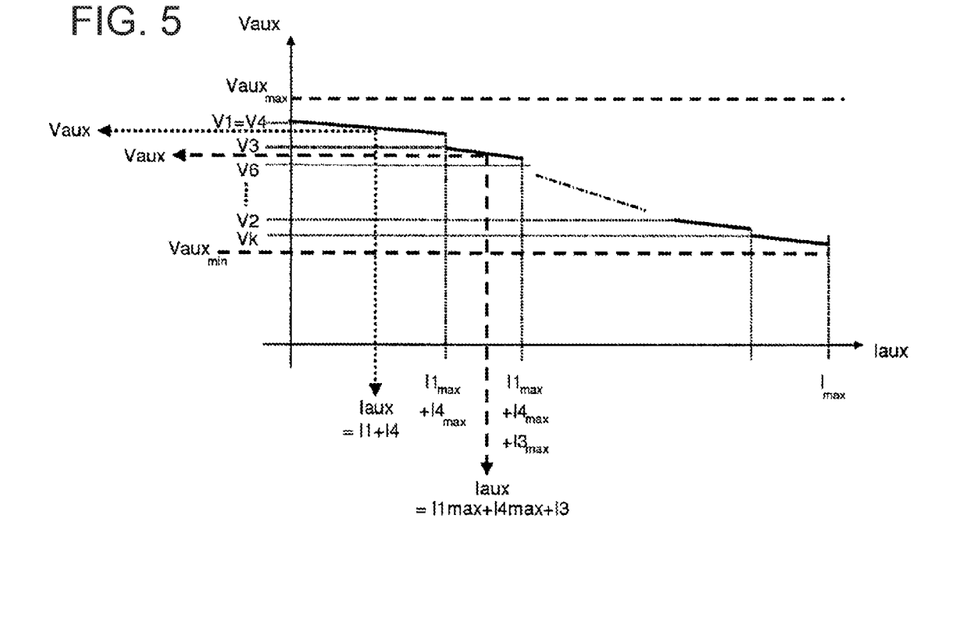
FIG. 5 is a graph illustrating the operation of the third embodiment of the balancing device when there is no battery connected to the terminals of the auxiliary device, without overlapping of the set value voltages of the different converters during the variations of intensity.

The method of regulation suggested by the invention gains from the tolerance of the level of voltage of the network 6 and possibly of the auxiliary battery 5, the nominal voltages of which can vary from about 10.5 volts to 14 volts (respectively corresponding to the values $V_{auxmax}$ and $V_{auxmin}$ illustrated in FIG. 5).

According to one mode of implementation of the invention, the set values of voltage $v_i$ applied to the converters $30_1$ to $30_k$ are defined by this range as a function of an order of priority defined by the control module 4. Indeed, the stages of accumulators $Et_1$ to Etk are classified by the control module 4 according to an order that is a function, for example, of their residual charge. A set value of voltage $v_i$ is assigned to each converter $30_i$. The higher the residual charge of a stage Eti, the higher is the set value voltage $v_i$ assigned by the control module 4 to the converter $30_i$ of that stage.

Figure 3:
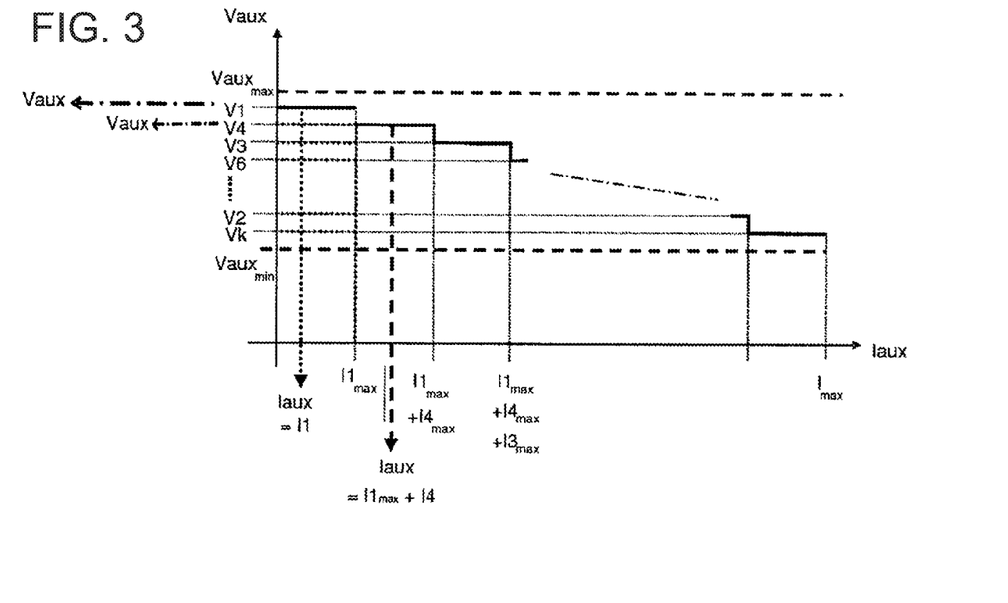
FIG. 3 is a graph illustrating the working of a first embodiment of the balancing device when there is no battery connected to the terminals of an auxiliary network.

According to a first embodiment, the control graph of which is illustrated in FIG. 3, the set values $V_i$ of voltage of the converters $30_i$ are fixed at predefined levels. The predefined levels can be stepped in identical voltage increments.

In the illustrated example, the control module 4 determines the following classification of the residual charges for the stages Eti:

Et1>Et4>Et3>Et6> . . . >Et2>Etk

As a consequence, the control module 4 assigns the predefined levels to the set values of voltage $V_i$ according to the following hierarchy:

$V_1 > V_4 > V_3 > V_6 > \ldots > V_2 > V_k$

With $V_{auxmax} > V_i > V_{auxmin}$

Figure 6:
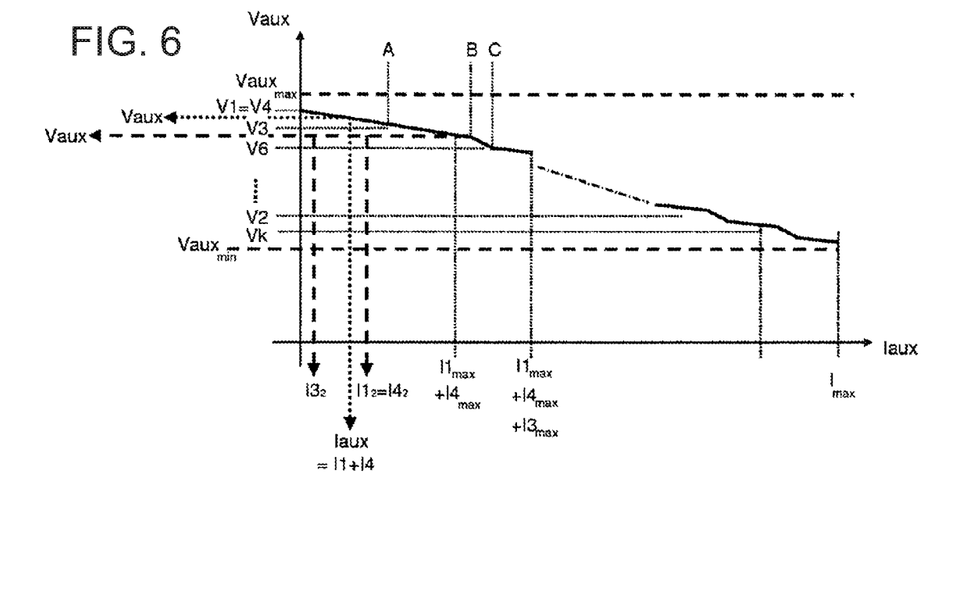
FIG. 6 is a graph illustrating the working of the third embodiment, with overlapping of set value voltages of the different converters.

In the graphs of FIGS. 3, 5, 6, the battery 5 is not connected to the network 6.

As can be seen from the graph of FIG. 3, the converters $30_i$ whose set value of voltage $v_i$ is the highest make a contribution to the current $I_{aux}$ on the network 6, automatically and as a priority.

In a first example (dotted arrow), the current $I_{aux}$ called by the network 6 is lower than the limitation $I_{1max}$. The converter $30_1$ thus gives the totality of the current $I_{aux}$ and dictates its output voltage $V_{s1}$ (corresponding appreciably to its set value of voltage $V_1$) as the voltage $V_{aux}$ on the network 6. Since the set values of voltage of the other converters are below the voltage $V_{aux}$, these other converters do not contribute to the current $I_{aux}$.

In a second example (arrow in dashes), the current $I_{aux}$ called by the network 6 is greater than the boundary $I_{1max}$ but lower than the limit $I_{1max}+I_{4max}$. Since $I_{aux}$ is greater than the limit $I_{1max}$, the output voltage $V_{s1}$ drops below the set value of voltage $V_1$ until it reaches the level of output voltage Vs4 (corresponding appreciably to the set value of voltage $V_4$). The converter $30_1$ gives its current $I_1=I_{1max}$. Owing to a set value of voltage $V_4$ below $V_1$, the converter 304 gives a current $I_4$ as a complement, so that $I_{aux}=I_{1max}+I_4$. Since the set values of voltage of the other converters are lower than the voltage Vaux, these other converters do not contribute to the current $I_{aux}$.

Thus, whenever $I_{aux}$ exceeds a threshold of intensity (corresponding to a totalizing of limitations of intensity of the converters, the stages of which are the most charged and/or the capacities of which are the highest), the voltage $V_{aux}$ drops and a new converter automatically makes its contribution to the current $I_{aux}$.

The invention makes it possible to distribute the current among the different stages by discharging the most charged stages as a priority, thus contributing to balancing the charges between the stages. Furthermore, such balancing is obtained by powering the network 6, the use of such balancing currents being thus optimized to limit unnecessary losses by dissipation. Furthermore, a balancing device 3 of this kind does not need interdependent, complex regulation loops at the converters. Besides, it avoids having to make use of complex communications interfaces adapted to the voltage levels of the different stages.

The control module 4 modifies the set values of voltage $v_i$ according to the progress of the determined residual charges. Examples of tracking of residual charge are described in detail here below.

In the examples illustrated, the converters $30_i$ all have a same limit of intensity $I_{imax}$. Converters $30_i$ comprising different limits of intensity $I_{imax}$ can of course be used in the framework of the invention.

Advantageously, each converter $30_i$ has a current sensor $30_1$ in order to be able to implement the current limitation function. Integrating a current sensor $30_1$ into each converter $30_i$ means that it is not necessary to provide for a communication of this information from the control module 4 to the different converters $30_i$.

Advantageously, each converter $30_i$ has a voltage sensor $30_2$ in order to be able to implement a voltage regulation loop. Integrating a voltage sensor $30_2$ into each converter $30_i$, means that it is not necessary to provide for a communication of this information from the control module 4 to the different converters $30_i$. Such regulation loops in the converters $30_i$ are not interdependent.

According to a second embodiment not shown, the values $v_i$ of the set values of voltage of the converters $30_i$ are fixed proportionally to the residual charge of their stages. For accumulators whose voltage at their terminals varies greatly according to their residual charge, the values $v_i$ of the set values of voltage of the converters $30_i$ can be advantageously fixed proportionally to the voltage measured at input of the converters.

In the first and second embodiments, the set values of voltage $v_i$ all have distinct levels to prevent possible indecision on the contributions to the current of the network 6 between two converters which would have identical set values of voltage.

Figure 4:
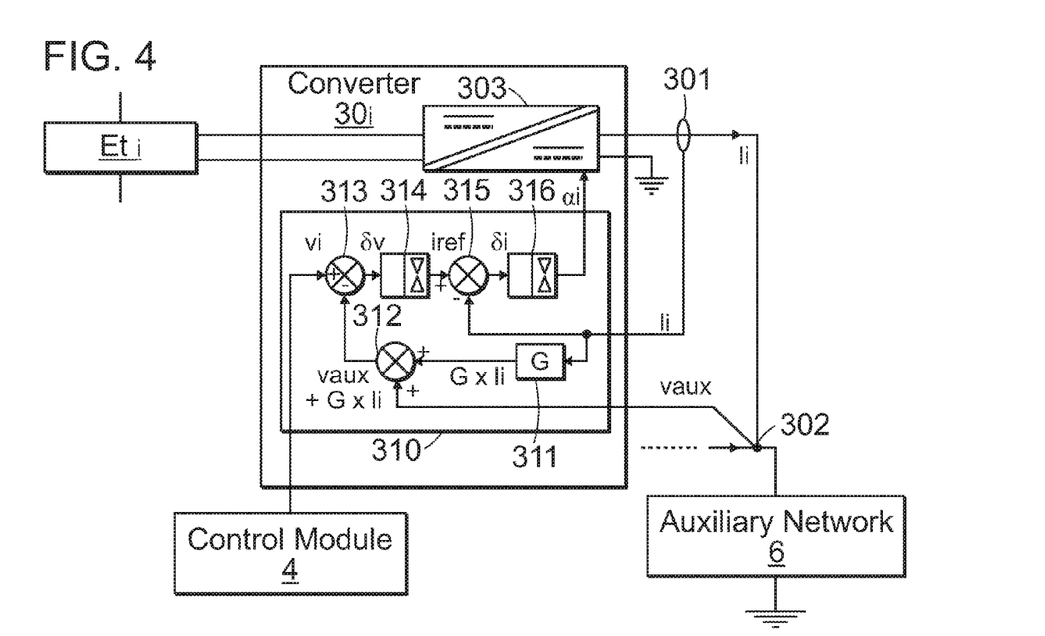
FIG. 4 is a schematic illustration of a converter with its regulation capable of being integrated into a third embodiment of a balancing device.

FIG. 4 illustrates an example of a converter $30_i$ with this regulation capable of being integrated into a balancing device 3 according to a third embodiment. In this embodiment, a positive internal resistance circuit is integrated into each converter to induce a drop in voltage proportional to the output current of the converter in the output voltage measured. Thus, converters controlled with the same set value of voltage distribute their contribution to the current $I_{aux}$ homogenously.

The converter $30_i$ includes a DC/DC conversion circuit 303 advantageously comprising a galvanic isolation. The converter $30_i$ furthermore comprises a regulation circuit 310. The regulation circuit 310 generates a cyclic ratio $\alpha i$, the value of which value ranges from 0 to 1 according to values $i_i$ and $V_{aux}$ measured respectively by the sensors $30_1$ and $30_2$. The regulation circuit 310 applies its set value of cyclic ratio $\alpha_i$ to the conversion circuit 303.

The regulation circuit 310 comprises a slow loop regulating the voltage $V_{aux}$ and including a multiplier 311 and a summation unit 312. The multiplier 311 applies a multiplier coefficient G to the current $i_i$. The summation unit 312 sums the voltage value $V_{aux}$ at the output of the multiplier 311. The output of the summation unit 312 enables an adjustment of a reduction of output voltage $v_{si}$ as a function of the current $i_i$ provided. The output of the summation unit 312 is applied to an inverter input of a differencing unit 313. The set value $v_i$ is applied to the non-inverter input of the differencing unit 313. The differencing unit 313 thus generates an output voltage error signal $\delta v$.

The regulation circuit 310 comprises a fast loop regulating the intensity $i_i$ and including a first corrector 314, a differencing unit 315, and a second corrector 316. The first corrector 314 prepares a set value of current Iref from the output voltage error signal $\delta v$. The first corrector 314 has a limiter that limits the variations of the value Iref to a predefined range. The first corrector 314 can be of any known type, for example, of a proportional-integral type. The differencing unit 315 subtracts the current measured $i_i$ from the set value of current Iref in order to generate a current error signal $\delta i$. The second corrector 316 prepares the cyclic ratio $\alpha i$ according to the current error signal $\delta i$. The second corrector 316 has a limiter that limits the variations of the value $\alpha i$ in a predefined range. The second corrector 316 can be of any known type. For example, the second corrector 316 can be a proportional-integral type corrector.

The graph of FIG. 5 illustrates a first implementation of the third embodiment. In this implementation, the drop in voltage induced by the positive resistance circuit in the regulation loop is lower than the difference between two successive levels of set values of voltage. The set value of voltage $V_1$ is herein identical to the set value of voltage $V_4$.

In a first example (illustrated by dotted arrow), a current $I_{aux}$ below $I_{1max}+I_{4max}$ is called up by the network 6. The converters $30_1$ and 304 each give identical currents $I_1$ and $I_4$. The voltage of the auxiliary network $V_{aux}$ is slightly lower than $V_1$ owing to the drop in voltage induced by the positive resistance circuit.

In a second example, illustrated by the arrow in dashe), a current $I_{aux}$ greater than $I_{1max}+I_{4max}$ but lower than $I_{1max}+I_{4max}+I_{3max}$ is called up by the network 6. The converters $30_1$ and 304 each give identical currents $I_{1max}$ and $I_{4max}$. The converter 303 gives a complementary current $I_3$ so that $I_{aux}$ is herein equal to $I_{1max}+I_{4max}+I_3$.

Once the intensity $I_{1max}+I_{4max}$ has been reached, the other converters $30_i$ are subjected one after the other to voltage jumps at each threshold of intensity. The voltage level $V_{aux}$ is determined by the characteristic curve $V_{aux}=f(I_{aux})$ illustrated.

The graph of FIG. 6 illustrates a second implementation of the third embodiment. In this implementation, the drop in voltage induced by the positive resistance circuit in the regulation loop is greater than the difference between two successive levels of set values of voltage. The set value of voltage $V_1$ is herein identical to the set value of voltage $V_4$.

In an overlap zone, the converters are made to operate according to the set values of voltage, the voltage $V_{aux}$ and the value of the internal resistance. For example, for a current $I_{aux}$ ranging from a zero current to the current corresponding to the point A, the converters $30_1$ and $304$ each give identical currents $I_1$ and $I_4$.

For a current $I_{aux}$ ranging from the point A to the point B, the converters $30_1$ and $304$ give currents distributed according to the set values of voltage, the voltage $V_{aux}$ and the internal resistance. The point A is defined as the point for which the voltage $V_{aux}$ is equal to the voltage $V_3$. The point B is defined as being the point for which the voltage $V_{aux}$ is equal to $V_1-R_i*I_{1max}$. The converters $30_1$ and $304$ each give a current equal to $(V_1-V_{aux})/R_i=(V_4-V_{aux})/R_i$, with $R_i$ being the internal resistance. These currents are denoted as $I_{12}$ and $I_{42}$ in FIG. 6. The converter $303$ gives the complement of the current, namely $I_{32}=I_{aux}-I_{12}-I_{42}$. The values of intensity are extrapolated by intersection between the characteristic $V=f(I)$ of each contributing converter taken in isolation (not shown for reasons of readability) and the voltage level $V_{aux}$ for the given operating point.

For a current $I_{aux}$ ranging from the point B to the point C, the converters $30_1$ and $304$ each give identical currents $I_{1max}$ and $I_{4max}$. The point C is defined as the point for which the voltage $V_{aux}$ is equal to the voltage $V_6$. The converter $303$ gives a complementary current $I_3$ so that $I_{aux}$ is herein equal to $I_{1max}+I_{4max}+I3$.

The control module 4 advantageously includes a sensor of the current $I_{aux}$ passing through the network 6. The control module 4 can thus extrapolate the output current of each converter $30_i$ from the set value voltage that is applied to it and the measured current $I_{aux}$. The current $I_{aux}$ can also be extrapolated by simple measurement of the voltage $V_{aux}$ performed by the control module 4 on the network 6. The control module 4 can indeed extrapolate the current $I_{aux}$ from the $V_{aux}=f(I_{aux})$.

With sufficient knowledge of the efficiency of each converter $30_i$ as a function of its output current, it is possible, from the extrapolated output current, to compute the current given by its stage $Et_i$ and thus the residual charge of that stage $Et_i$.

Determining the discharge of the stage $Et_i$ in this way by computation is especially advantageous when the stages of the battery 2 include electrochemical accumulators having a very flat voltage profile as a function of charge. For example, the voltage profile of a lithium-ion LiFePO$_4$ type accumulator as a function of its charge is so flat that it is not readily possible to determine its charge with precision by measuring the voltage at its terminals.

When an auxiliary battery 5 or an auxiliary electrical storage device is connected to the terminals of the network 6, the working of the regulation device 3 can be adapted accordingly. The control module 4 could thus adapt the set values of voltage $v_i$ at different levels relative to the voltage of the auxiliary battery 5 in order to carry out either the recharging or the discharging of this auxiliary battery. In this configuration, the set values of voltage $v_i$ are also included in the range of operating voltages of the auxiliary battery 5. The hierarchy of the levels of the set values $v_i$ is also assigned to the converters $30_i$, depending on the hierarchy of the residual charges of the stages $Et_i$.

Figure 7:
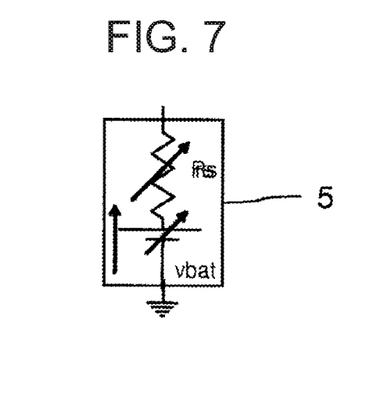
FIG. 7 is an equivalent electrical diagram of a battery connected to the auxiliary network.

The electrical diagram of FIG. 7 models the battery 5. The battery 5 is considered to comprise a no-load voltage $v_{bat}$ and a series resistance $r_s$. This resistance $r_s$ is deemed to have a same value in charging and in discharging. To simplify the analysis of the operation of the balancing device 3 in combination with the battery 5, the description will be based on converters $30_i$ having a linear characteristic of the characteristic voltage $V=f(I)$.

To combine the operation of the balancing device 3 with a battery 5, the invention advantageously uses converters $30_i$ with positive internal resistance. The slope of the characteristic curve $V_{si}=f(I_i)$ of the converters $30_i$ can be adjusted dynamically to the characteristic of the battery 5 and/or the speed of charging/discharging desired for this battery 5.

The levels of the set values of voltage $v_i$ will be read so that at least one of the set values of voltage is greater than the voltage $v_{bat}$ of the battery 5 in order to carry out its charging. To charge the battery 5 by means of the set of converters $30_i$, each of the set values of voltage is greater than the voltage $v_{bat}$.

The levels of the set values of voltage $v_i$ will be lowered so that all the set values of voltage are lower than the voltage $V_{bat}$ of the battery 5 in order to carry out a discharging in the stages Eti.

Figure 8:
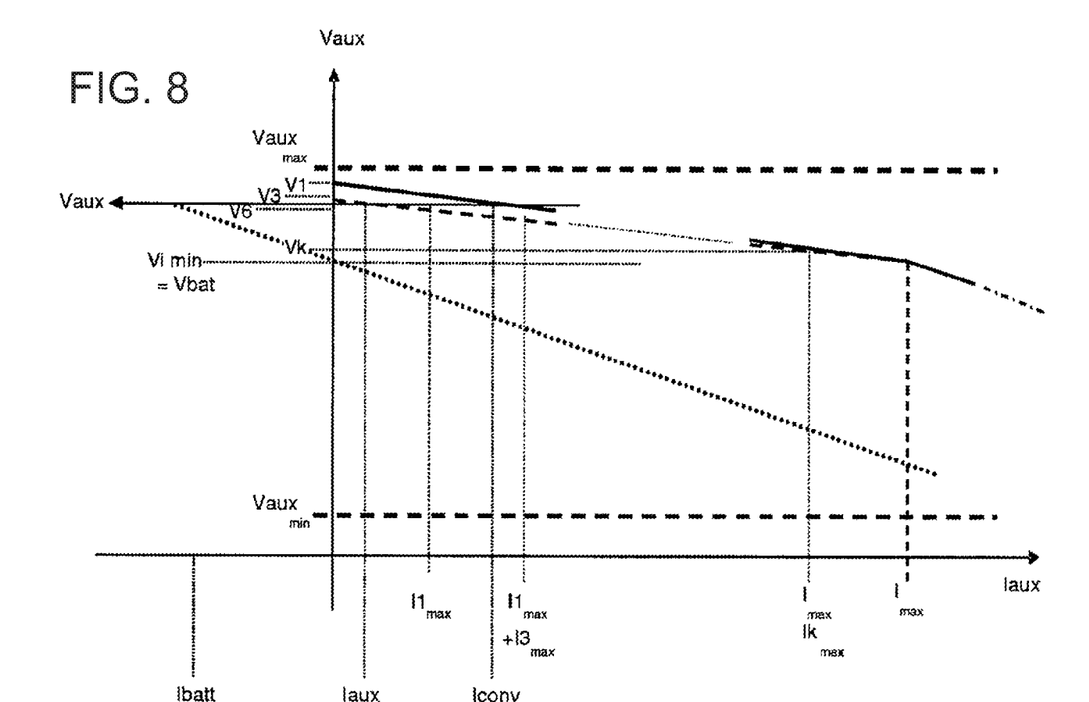
FIG. 8 is a graph illustrating the working of the third embodiment of the balancing device when there is a battery at the terminals of the auxiliary network during a re-charging of the battery.

FIG. 8 illustrates a mode of operation of such a balancing device 3 during the re-charging of the battery 5 by only a part of the converters $30_i$. The solid-line curve corresponds to the characteristic of the converters $30_i$ when there is no battery 5. The curve of dashes corresponds to the characteristic of the converters $30_i$ when there is a battery 5. The dotted curve corresponds to the characteristic of the battery 5 when there are no converters $30_i$.

For an auxiliary current $I_{aux}$, the current given by the converters $30_i$ is equal to the current $I_{conv}$ and the current absorbed by the battery is equal to $-I_{bat}$ (by convention applicable to generators). The battery 5 is therefore being charged. The charging current $I_{bat}$ through the battery 5 diminishes when the auxiliary current $I_{aux}$ increases. The auxiliary battery 5 gives current when the converters $30_i$ have all reached their current limit.

The distribution of the currents between the converters depends on their set value of voltage $V_i$. For the case illustrated in FIG. 8, the converter $30_1$ associated with the stage $Et_1$ gives its maximum current $I_{1max}$. The converter $303$ associated with the stage Et3 gives the complement of the current, namely $I3=I_{conv}-I_{1max}$. Indeed, the voltage $V_{aux}$ on the network 6 is lower than the set value voltage V3 of the converter $303$.

If it is desired that the auxiliary battery 5 should give a part of the current $I_{aux}$ absorbed by the network 6 without being re-charged, whatever the current $I_{aux}$ given to the network 6, for example when the state of charge of the battery 5 is maximum, the set value of voltage of the converter of the stage having the highest residual charge should be lower than or equal to the open-circuit voltage or no-load voltage of the auxiliary battery 5.

Figure 9:
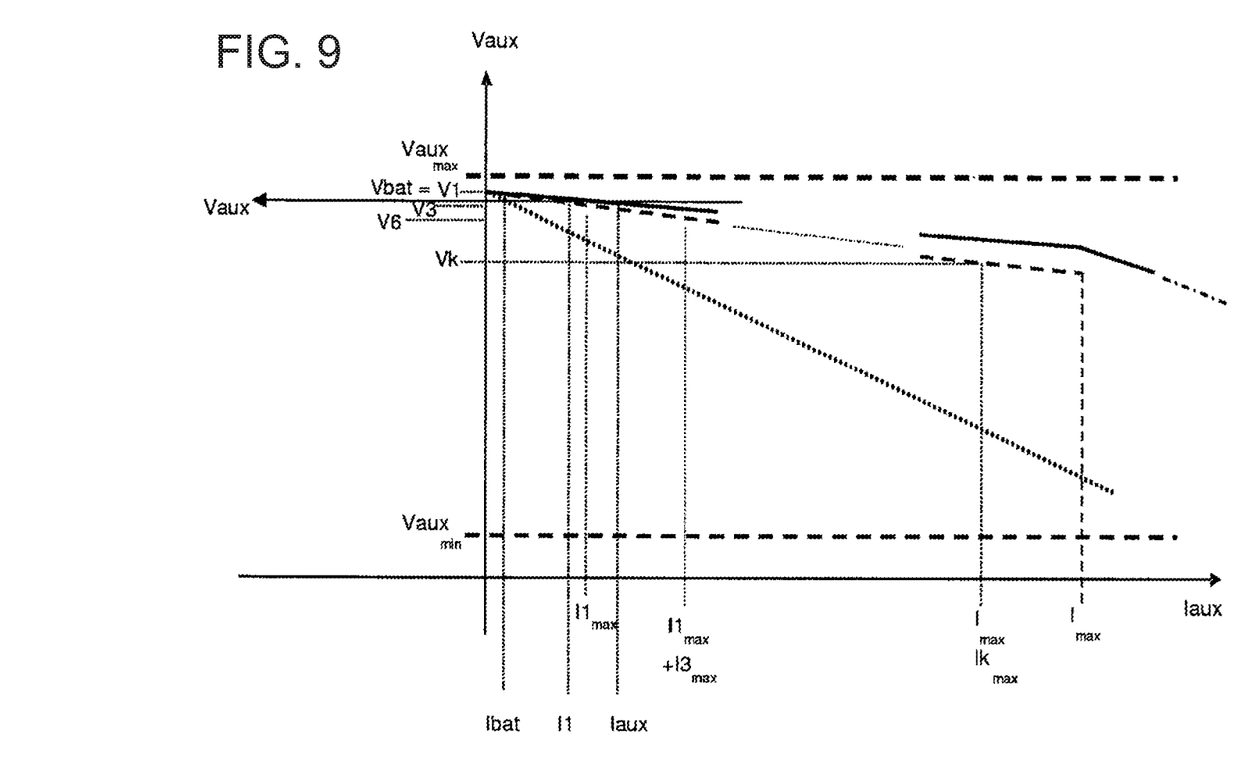
FIG. 9 is a graph illustrating the working of the third embodiment of the balancing device when there is a battery at the terminals of the auxiliary network during a discharging of this battery.

Such an operation is illustrated in FIG. 9. The solid-line curve corresponds to the characteristic curve of the converters $30_i$ in the presence of the battery 5. The curve of dashes corresponds to the characteristic of the converters $30_i$ when there is no battery 5. The dotted curve corresponds to the characteristic of the battery 5 when there are no converters $30_i$.

The set value of voltage $V_1$ of the converter $30_1$ associated with the stage $Et_1$ (presenting the highest residual charge) has been chosen to be equal to the voltage vbat. Thus, the auxiliary current $I_{aux}$ is given jointly by the auxiliary battery 5 and the converters when the auxiliary current is not zero. If the set value of voltage $V_1$ is chosen to be greater than the voltage vbat, the current $I_{aux}$ will be given only by the auxiliary battery 5 until the voltage $V_{aux}$ of the network 6 reaches the set value of voltage $V_1$.

For a current $I_{aux}$, the current given by the converters $30_i$ is equal to the current $I_{conv}$ and the current given by the battery 5 is equal to $I_{bat}$ (by convention applicable to generators). The battery 5 therefore contributes to giving a part of the current $I_{aux}$ on the network 6. The current $I_{bat}$ increases when the current $I_{aux}$ increases. The distribution of the currents between the converters 30$_i$ depends on their set value of voltage $v_i$. For the case illustrated in FIG. 9, the converter 30$_1$ associated with the stage $Et_1$ gives a current $I_1$ lower than its limit $I_{1max}$. Indeed, the voltage $V_{aux}$ is greater than the set value of voltage $V3$ of the converter 303.

The control module 4 can extrapolate the residual charges of the stages $Et_i$ by means of the measurements and computations described in detail here above. The control module 4 must only have available the residual charge of the battery 5 to carry out an extrapolation of the residual charges of the stages $Et_i$. The charge extracted from the battery 5 can also be extrapolated by measuring the current $I_{aux}$. The use of a voltage sensor makes it possible to estimate the current $I_{aux}$ and the current $I_{bat}$, taking the residual charge and the temperature of the battery 5 to be known.

Figure 10:
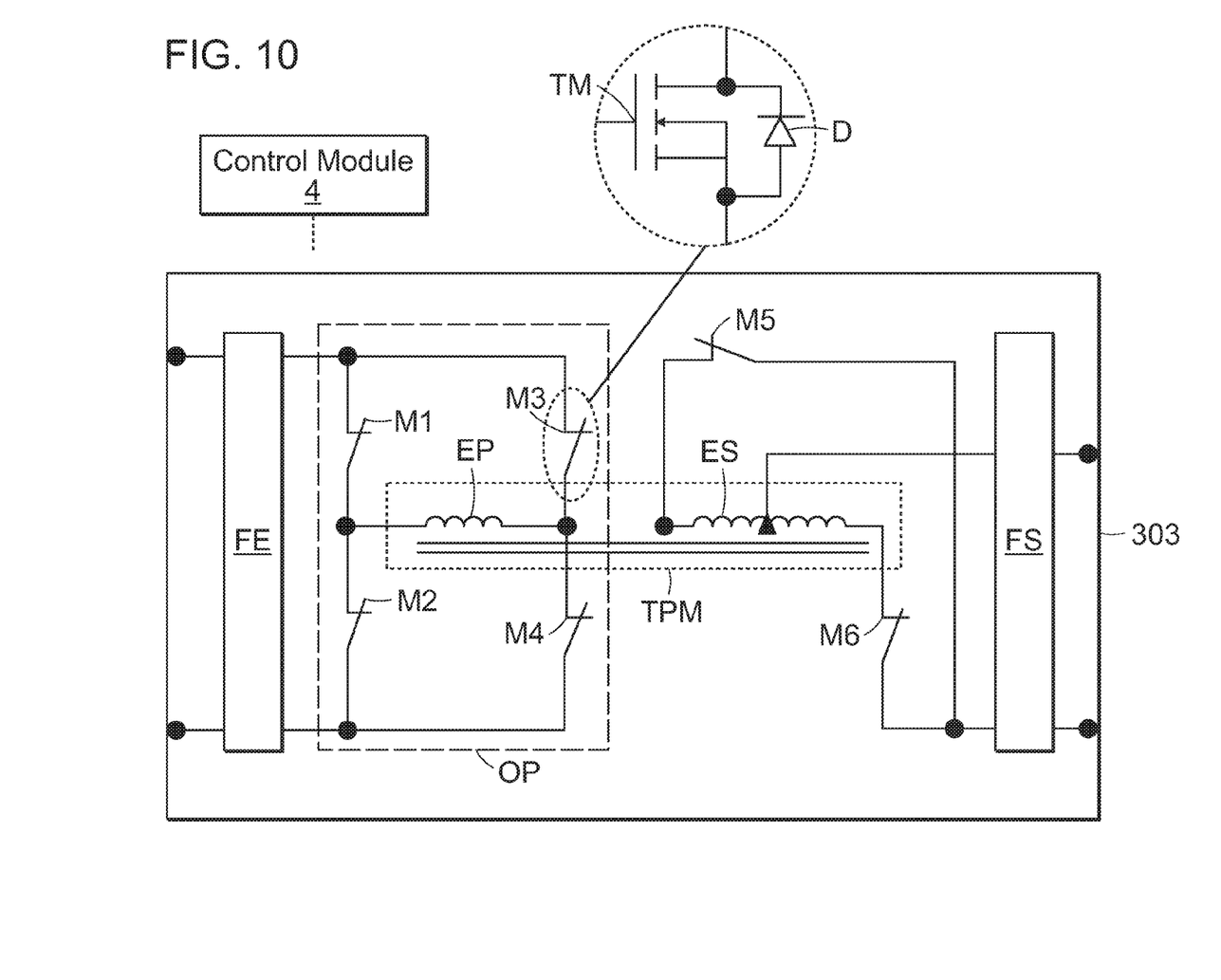
FIG. 10 illustrates a particularly advantageous example of a conversion circuit that can be integrated into the converters.

FIG. 10 illustrates an example of a conversion circuit 303 that is particularly advantageous for a balancing device according to the invention. The conversion circuit 303 comprises an input filter FE connected to the interface of the input connection. The output of the filter FE is connected to a full-bridge inverter OP. The full-bridge inverter includes controlled switches M1, M2, M3 and M4. The conversion circuit 303 also has a transformer with midpoint-grounded secondary winding TPM. The transformer TPM has a primary winding EP connected to the bridge between the switches M1 to M4. The switches M1 to M4 are controlled in pulse-width-modulation by the control module 4 in order to define the level of output voltage. The conversion circuit 303 furthermore has a synchronous rectifier including controlled switches M5 and M6. The secondary winding ES is connected between the switches M5 and M6.

The midpoint-grounded transformer TPM is used to minimize the number of switches at the secondary winding to obtain a rectification of the signals. The control module 4 controls the controlled switches M1 to M6. These controlled switches M1 to M6 can have the structure illustrated: an nMOS transistor type TM with a flyback or freewheeling diode D connected in parallel. Such switches M5 and M6 must be preferred instead of a rectification by means of diodes in order to maximize the efficiency of the conversion circuit 303.

The output filter FS has its inputs connected between the midpoint of the secondary winding and a node common to the switches M5 and M6. The outputs of the filter FS form the output interface of the conversion circuit 303.

Although not illustrated, the electrical power system 1 advantageously has a device for measuring and monitoring the voltages at the terminals of the accumulator stages $Et_i$.

The invention claimed is:

1. An apparatus comprising a charge-balancing device for balancing charge of an electrical power-storage device that comprises several series-connected electrical storage elements, said charge-balancing device comprising two DC/DC converters with current limitation, each DC/DC converter having:
    an input for receiving from a control module a set value of an output voltage of said converter,
    an input to be connected to said terminals of a respective storage element, and
    an output to be connected to an electric network having a voltage regulated at a level below a voltage at said terminals of said power-storage device,
    wherein said control module is configured to determine respective residual charges of said electrical storage elements connected to said inputs of said DC/DC converters and to apply a higher set value of voltage to said DC/DC converter connected to the electrical storage element that has a highest residual charge.

2. The apparatus of claim 1, wherein each converter comprises a current sensor at said output thereof and a voltage sensor at said output thereof.

3. The apparatus of claim 1, wherein each converter comprises a regulation loop for regulating said voltage applied to said output thereof, wherein said regulation loop lowers said set value of voltage by an extent that is proportional to said current provided by said converter at said output thereof.

4. The apparatus of claim 1, wherein said control module is configured to apply identical set values of voltage to said converters.

5. The apparatus of claim 1, wherein said control module is configured to generate a set value of voltage for each converter, wherein said set value is proportional to a determined residual charge of an electrical storage element.

6. The apparatus of claim 1, wherein said control module is configured to generate set values of voltage that are distinct and stepped according to identical voltage increments.

7. The apparatus of claim 6, wherein a hierarchy for said assigning said set values of voltage by said control module corresponds to a hierarchy of said determined residual charges.

8. The apparatus of claim 1, further comprising four switches, wherein controls said control module said four switches to cause pulse-width modulation, wherein at least one of said converters comprises a transformer, wherein said transformer comprises a primary winding, wherein said primary winding is connected as a bridge between said four switches.

9. The apparatus of claim 8, wherein said transformer is a mid-point transformer, wherein said transformer comprises a secondary winding, wherein said secondary winding is connected between two switches controlled by said control module, and wherein said secondary winding comprises a mid-point connected to an output of said converter.

10. The apparatus of claim 1, further comprising an electrical-power storage device including several electrical storage elements, said electrical storage elements being connected to respective converters of said charge-balancing device, and an electrical network connected to said output of said charge-balancing device and having a voltage regulated at a level below a voltage at said terminals of said storage device.

11. The apparatus of claim 10, wherein said set values of voltages are included in said range of regulation voltages of said network.

12. The apparatus of claim 10, wherein said control module is further configured to retrieve a measurement of said current provided by said charge-balancing device to said network, and to extrapolate said residual charge of each of said electrical storage elements according to said measurement of current retrieved.

13. The apparatus of claim 10, wherein said storage device comprises a power battery comprising electrochemical accumulators.

14. The apparatus of claim 10, wherein a nominal voltage of said power battery is at least six times greater than a nominal voltage of regulation of said network.

15. The apparatus of claim 1, further comprising a motor vehicle, wherein said network is an auxiliary network for powering peripherals, said auxiliary network having a regulation voltage that ranges from 10.5 volts to 14 volts.

* * * * *